United States Patent
Park et al.

(10) Patent No.: US 11,165,059 B2
(45) Date of Patent: Nov. 2, 2021

(54) NEGATIVE ELECTRODE ACTIVE MATERIAL HAVING HIGH OUTPUT CHARACTERISTICS AND LITHIUM SECONDARY BATTERY INCLUDING THE SAME

(71) Applicant: LG CHEM, LTD., Seoul (KR)

(72) Inventors: Sung-Bin Park, Daejeon (KR); Ji-Young Park, Daejeon (KR); Bo-Ram Lee, Daejeon (KR); Chi-Ho Jo, Daejeon (KR); Jung-Min Han, Daejeon (KR); Hyuck Hur, Daejeon (KR); Wang-Mo Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 221 days.

(21) Appl. No.: 16/341,329

(22) PCT Filed: Mar. 13, 2018

(86) PCT No.: PCT/KR2018/002953
§ 371 (c)(1),
(2) Date: Apr. 11, 2019

(87) PCT Pub. No.: WO2018/169290
PCT Pub. Date: Sep. 20, 2018

(65) Prior Publication Data
US 2020/0052294 A1 Feb. 13, 2020

(30) Foreign Application Priority Data
Mar. 13, 2017 (KR) .......................... 10-2017-0031306

(51) Int. Cl.
*H01M 4/485* (2010.01)
*C01G 23/00* (2006.01)
(Continued)

(52) U.S. Cl.
CPC .......... *H01M 4/485* (2013.01); *C01G 23/005* (2013.01); *H01M 10/0525* (2013.01);
(Continued)

(58) Field of Classification Search
CPC ............ H01M 4/485; H01M 10/0525; H01M 2004/027; C01G 23/005; C01P 2006/11; C01P 2006/12; C01P 2006/40
See application file for complete search history.

(56) References Cited

U.S. PATENT DOCUMENTS

2006/0257746 A1  11/2006  Inagaki et al.
2006/0262552 A1  11/2006  Komatsu et al.
(Continued)

FOREIGN PATENT DOCUMENTS

CN  103247795 A  8/2013
JP  2009-32704 A  2/2009
(Continued)

OTHER PUBLICATIONS

International Search Report issued in PCT/KR2018/002953 (PCT/ISA/210), dated Nov. 15, 2018.
(Continued)

*Primary Examiner* — Jimmy Vo
(74) *Attorney, Agent, or Firm* — Birch, Stewart, Kolasch & Birch, LLP

(57) ABSTRACT

A negative electrode active material including lithium titanium oxide particles, wherein the lithium titanium oxide particles have a Na content of 50 ppm-300 ppm, a K content of 500 ppm-2400 ppm and a crystallite size of 100-200 nm, and a lithium secondary battery including the same.

8 Claims, 1 Drawing Sheet

(51) Int. Cl.
*H01M 10/0525* (2010.01)
*H01M 4/02* (2006.01)
(52) U.S. Cl.
CPC ....... *C01P 2006/11* (2013.01); *C01P 2006/12* (2013.01); *C01P 2006/40* (2013.01); *H01M 2004/027* (2013.01)

(56) References Cited

U.S. PATENT DOCUMENTS

| | | | |
|---|---|---|---|
| 2008/0113264 A1 | 5/2008 | Inagaki et al. | |
| 2009/0162750 A1* | 6/2009 | Kawakami | H01M 4/386 |
| | | | 429/218.1 |
| 2013/0149612 A1 | 6/2013 | Takemoto et al. | |
| 2013/0202968 A1 | 8/2013 | Song et al. | |
| 2013/0244114 A1* | 9/2013 | Yamamoto | H01B 1/08 |
| | | | 429/231.5 |
| 2014/0017567 A1 | 1/2014 | Oh et al. | |
| 2014/0048968 A1 | 2/2014 | Honma et al. | |
| 2014/0050657 A1* | 2/2014 | Takeshima | C01D 15/02 |
| | | | 423/598 |
| 2014/0312269 A1 | 10/2014 | Laumann et al. | |
| 2016/0079594 A1 | 3/2016 | Choi et al. | |
| 2018/0013128 A1 | 1/2018 | Lim et al. | |

FOREIGN PATENT DOCUMENTS

| | | |
|---|---|---|
| JP | 2012-48963 A | 3/2012 |
| JP | 2014-524653 A | 9/2014 |
| JP | 2015-201438 A | 11/2015 |
| JP | 2015-219963 A | 12/2015 |
| KR | 10-2006-0117247 A | 11/2006 |
| KR | 10-2010-0082743 A | 7/2010 |
| KR | 10-2013-0091540 A | 8/2013 |
| KR | 10-2014-0006902 A | 1/2014 |
| KR | 10-2014-0137720 A | 12/2014 |
| KR | 10-2016-0070560 A | 6/2016 |
| WO | WO 2016/117950 A1 | 7/2016 |

OTHER PUBLICATIONS

European Search Report for Appl. No. 18767602.8 dated Feb. 12, 2020.

* cited by examiner

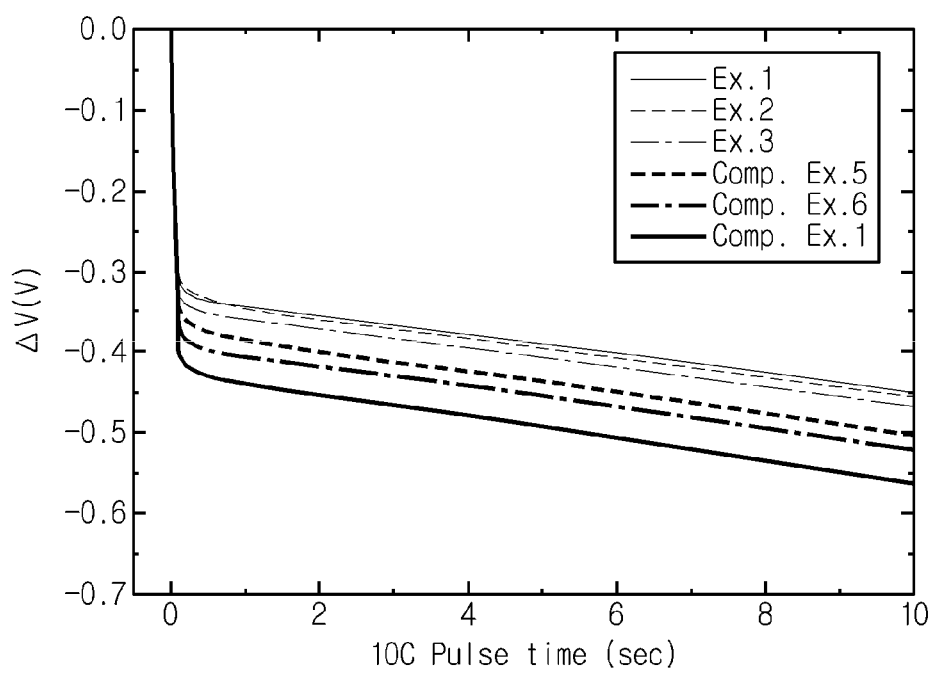

NEGATIVE ELECTRODE ACTIVE MATERIAL HAVING HIGH OUTPUT CHARACTERISTICS AND LITHIUM SECONDARY BATTERY INCLUDING THE SAME

TECHNICAL FIELD

The present disclosure relates to a negative electrode active material having high output characteristics and a lithium secondary battery including the same.

The present application claims priority to Korean Patent Application No. 10-2017-0031306 filed on Mar. 13, 2017 in the Republic of Korea, the disclosures of which are incorporated herein by reference.

BACKGROUND ART

A need for an eco-friendly substitute energy source has become an essential factor for the future life, as the cost of energy sources has been increased due to the depletion of fossil fuel and the interest about environmental pollution has been increased.

Efforts into research and development of electrochemical devices have been activated gradually, as the application spectrum of electrochemical devices have been extended to cellular phones, camcorders and notebook computers, and to energy sources for electric vehicles.

In this context, electrochemical devices have been most spotlighted. Particularly, development of rechargeable secondary batteries has been focused. Recently, many studies have been conducted about designing a novel electrode and battery in order to improve the capacity density and specific energy in developing such batteries.

Particularly, in the case of a lithium secondary battery, its application is realized as a power source for electric vehicles (EV), hybrid electric vehicles (HEV), micro-hybrid electric vehicles (u-HEV), or the like. In addition, application of a lithium secondary battery has been extended to a supplementary electric power source through gridation.

A micro-hybrid vehicle partially uses a secondary battery and development of a 12V dual or 48V secondary battery used therefor has been carried out with a view to higher output performance.

Meanwhile, lithium titanium oxide shows an initial charge/discharge cycle efficiency of approximately 100% and has a high operating voltage so that no surface film is formed on a negative electrode due to the decomposition of an electrolyte. Thus, application of lithium titanium oxide to a negative electrode material for providing high output is expected.

Thus, use of lithium titanium oxide is essential in order to realize high rate charge/discharge characteristics of 20 C or more. However, there is a problem in that currently used lithium titanium oxide cannot satisfy the corresponding output.

Therefore, there is still a need for a lithium titanium oxide negative electrode material which can be applied to the field of hybrid vehicles requiring high output characteristics.

DISCLOSURE

Technical Problem

The present disclosure is designed to solve the problems of the related art, and therefore the present disclosure is directed to providing a negative electrode active material which can be used for a battery having high output characteristics and is obtained through a simple manufacturing process.

The present disclosure is also directed to providing a lithium secondary battery provided with the negative electrode active material.

Technical Solution

In one aspect of the present disclosure, there is provided a negative electrode active material in order to solve the above-mentioned technical problems.

According to a first embodiment of the present disclosure, there is provided a negative electrode active material including lithium titanium oxide particles, wherein the lithium titanium oxide particles have a Na content of 50 ppm-300 ppm, a K content of 500 ppm-2400 ppm and a crystallite size of 100-200 nm, and the lithium titanium oxide is represented by the following Chemical Formula 1:

$$Li_xTi_yO_zM_w \qquad \text{[Chemical Formula 1]}$$

Wherein M is any one selected from the group consisting of Zr, B, Sn, S, Be, Ge and Zn, or a combination of two or more of them, $0.5 \leq x \leq 5$, $1 \leq y \leq 5$, $2 \leq z \leq 12$, and $0 \leq w < 0.1$.

According to a second embodiment, there is provided the negative electrode active material of the first embodiment, wherein the lithium titanium oxide particles are at least one selected from primary particles and secondary particles formed of the primary particles.

According to a third embodiment, there is provided the negative electrode active material of the second embodiment, wherein the primary particles have an average particle diameter ($D_{50}$) of 0.8-1.2 μm and a specific surface area of 5-8 m²/g.

According to a fourth embodiment, there is provided the negative electrode active material of the second embodiment, wherein the lithium titanium oxide particles are secondary particles, which have an average particle diameter ($D_{50}$) of 2-9 μm and a specific surface area of 3-6 m²/g.

According to a fifth embodiment, there is provided the negative electrode active material of any one of the first to the fourth embodiments, wherein the lithium titanium oxide is at least one selected from the group consisting of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$ and $Li_2TiO_3$.

According to a sixth embodiment, there is provided the negative electrode active material of any one of the first to the fifth embodiments, which further includes any one active material particles selected from the group consisting of: a carbonaceous material; metal (Me), such as Si, Sn, Li, Zn, Mg, Cd, Ce, Ni or Fe; alloy including the metal (Me); oxide (MeOx) of the metal (Me); and a composite of the metal (Me) with carbon, or a combination of two or more of them.

In another aspect of the present disclosure, there is also provided a lithium secondary battery in order to solve the above-mentioned technical problems.

According to a seventh embodiment of the present disclosure, there is provided a lithium secondary battery including a positive electrode including a positive electrode active material, a negative electrode including a negative electrode active material, a separator interposed between the positive electrode and the negative electrode, and an electrolyte, wherein the negative electrode active material is the negative electrode active material as defined in any one of the first embodiment to the sixth embodiment.

Advantageous Effects

According to an embodiment of the present disclosure, it is possible to reduce electric resistance by using a negative electrode active material obtained by controlling the Na content, K content and a crystallite size of lithium titanium oxide particles. It is also possible to apply the negative electrode active material to a battery, such as a micro-hybrid battery, for vehicles requiring high output.

DESCRIPTION OF DRAWINGS

FIG. 1 is a graph illustrating the results of evaluation of a voltage drop in each of the half coin cells according to Examples 1-3 and Comparative Examples 1, 5 and 6.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a negative electrode active material including lithium titanium oxide particles, wherein the lithium titanium oxide particles have a Na content of 50 ppm-300 ppm, K content of 500 ppm-2400 ppm and a crystallite size of 100-200 nm, and the lithium titanium oxide is represented by the following Chemical Formula 1:

$$Li_xTi_yO_zM_w$$ [Chemical Formula 1]

Wherein M is any one selected from the group consisting of Zr, B, Sn, S, Be, Ge and Zn, or a combination of two or more of them, $0.5 \leq x \leq 5$, $1 \leq y \leq 5$, $2 \leq z \leq 12$, and $0 \leq w < 0.1$.

According to an embodiment of the present disclosure, in the negative electrode active material represented by Chemical Formula 1, $3.5 \leq x \leq 4.5$, $4.5 \leq y \leq 5.5$, and $11.5 \leq z \leq 12.5$.

In addition, the lithium titanium oxide may have at least one crystal structure selected from spinel, perovskite and orthorhombic, but is not limited thereto.

For example, the lithium titanium oxide may be $Li_{0.8}Ti_{2.2}O_4$, $Li_{2.67}Ti_{1.33}O_4$, $Li_{1.33}Ti_{1.67}O_4$, $Li_4Ti_5O_{12}$, $LiTi_2O_4$, $Li_2TiO_3$, or the like. More particularly, the lithium titanium oxide may be $Li_4Ti_5O_{12}$, $Li_{1.33}Ti_{1.67}O_4$ or $LiTi_2O_4$ which has an excellent spinel structure undergoing little change in crystal structure during charging/discharging, but is not limited thereto.

According to an embodiment of the present disclosure, the lithium titanium oxide (LTO) may be in the form of lithium titanium oxide primary particles, secondary particles formed by aggregation of a plurality of primary particles, or a combination of such primary particles with secondary particles.

According to an embodiment of the present disclosure, the lithium titanium oxide may include a small amount of non-aggregated primary particles of free lithium titanium oxide, besides lithium titanium oxide secondary particles, but may substantially include secondary particles.

According to an embodiment of the present disclosure, lithium titanium oxide used as a negative electrode active material may preferably include the secondary particles of lithium titanium oxide in an amount of 70 wt % or more, 80 wt % or more, 90 wt % or more, or 95 wt % or more, based on 100 wt % of the total lithium titanium oxide contained in the negative electrode.

To obtain lithium titanium oxide which shows high output characteristics, it is required to reduce the size of primary particles of lithium titanium oxide and to decrease the crystallite size.

When the size of primary particles is reduced while ensuring the space between lithium titanium oxide primary particles, the Li ion distance is decreased in the particles and the reactive area of Li ions is increased, thereby providing significantly increased output characteristics.

According to the present disclosure, Na and K are used as dopants for reducing the size of lithium titanium oxide primary particles. Lithium titanium oxide is an oxide having a spinel structure and its (111) surface is stable during the firing so that it is grown into an octahedral form. However, when dopants, such as Na and K, are added, it is possible to inhibit growth of crystallites by reducing the energy of the surfaces other than (111) surface.

Each of Na and K functions to inhibit growth of spinel-type lithium titanium oxide crystals to allow production of lithium titanium oxide having a small crystallite diameter. In addition, since the lithium titanium oxide according to the present disclosure contains Na and K, stability of its crystal structure is increased to such a degree that the charge-discharge cycle characteristics of a non-aqueous electrolyte battery may be improved. It is also possible to improve the ion conductivity of lithium titanium oxide.

An embodiment of the method for preparing the lithium titanium oxide according to the present disclosure will be explained hereinafter, but the scope of the present disclosure is not limited thereto.

First, a lithium salt, such as lithium hydroxide, lithium oxide or lithium carbonate, used as a lithium source is prepared. In addition, sodium hydroxide as a sodium source and potassium hydroxide as a potassium source are prepared. A predetermined amount of at last one of the lithium source, sodium source and potassium source is dissolved in pure water to obtain an aqueous solution. A preferred amount of the sodium source and potassium source may be controlled depending on the content of Na and K in the finished lithium titanium oxide.

Next, titanium oxide is introduced to the solution so that lithium and titanium may have a predetermined atomic ratio. For example, when preparing a lithium titanium composite oxide having a spinel structure and represented by the chemical formula of $Li_4Ti_5O_{12}$, titanium oxide is added so that the atomic ratio of Li to Ti may be 4:5.

Then, the resultant solution is dried under agitation to obtain a baking precursor. For example, the drying process used herein may include spray drying, powder drying, freeze drying or a combination thereof. The resultant baking precursor may be heat treated (baked) to form lithium titanium oxide according to an embodiment of the present disclosure. The heat treatment may be carried out under atmospheric pressure or under oxygen gas atmosphere or argon gas atmosphere.

The heat treatment may be carried out at a temperature of 680° C.-1000° C. for about 1 hour to about 24 hours. Particularly, the heat treatment may be carried out at a temperature of 720° C.-800° C. for 5-10 hours. When the heat treatment temperature is lower than 680° C., the reaction between titanium oxide and a lithium compound is insufficient, thereby providing an increased amount of impurities, such as anatase type $TiO_2$, rutile type $TiO_2$ and $Li_2TiO_3$, resulting in a decrease in electric capacity. On the other hand, when the heat treatment temperature is higher than 1000° C., sintering of spinel type lithium titanate is performed and the crystallite diameter becomes excessively large to cause degradation of high-current performance.

In addition, instead of dissolution of sodium hydroxide and/or potassium hydroxide in water, titanium oxide containing a predetermined amount of Na or K may be used as a starting material.

According to the present disclosure, lithium titanium oxide particles may have a Na content of 50-300 ppm, particularly 50-250 ppm, and more particularly 50-200 ppm.

When the lithium titanium oxide particles have a Na content less than 50 ppm, it is difficult to obtain a sufficient effect of inhibiting growth of crystals and to improve ion conductivity. When the Na content is larger than 300 ppm, Na may be inserted to the site of Li, which may cause degradation of capacity and output.

According to the present disclosure, lithium titanium oxide particles may have a K content of 500-2400 ppm, particularly 500-2200 ppm, and more particularly 500-2000 ppm.

When the lithium titanium oxide particles have a K content less than 500 ppm, it is difficult to obtain a sufficient effect of inhibiting growth of crystals and to improve ion conductivity. When the K content is larger than 2400 ppm, the crystallite becomes excessively small and particle growth is not accomplished sufficiently, thereby making it difficult to ensure pellet density. When the pellet density is hardly ensured, a current collector, such as Al foil, may be broken during the pressing of an electrode and the electrode becomes thick to cause a decrease in energy density.

Herein, the finished Na content and K content of the lithium titanium oxide particles may be determined through an inductively coupled plasma spectrometer (ICP).

The lithium titanium oxide particles may have a crystallite size of 100-200 nm, particularly 110-180 nm, and more particularly 120-180 nm.

When the crystallite size is less than 100 nm, the number of grain boundaries is excessively large, thereby making it difficult to carry out lithium intercalation and causing degradation of charging characteristics. When the crystallite size is larger than 200 nm, lithium ion diffusion is difficult inside of the grains to increase resistance, resulting in degradation of output.

The crystallite size of lithium titanium oxide may be determined by using TOPAS, a program currently used for Rietveld refinement based on X-ray diffractometry. Determination of crystallite size using the TOPAS program may adopt any method used currently in the art.

According to the present disclosure, lithium titanium oxide particles may have an average particle diameter (volume based average particle diameter, $D_{50}$) of 0.5-9 μm, particularly 0.9-8 μm, and more particularly 1-7 μm. When the lithium titanium oxide particles have an average particle diameter satisfying the above-defined range, they have a preferred pellet density.

Particularly, when the lithium titanium oxide particles are primary particles, $D_{50}$ of the primary particles may be 0.8-1.2 μm. In addition, when the lithium titanium oxide particles are secondary particles, $D_{50}$ of the secondary particles may be 2-9 μm, more particularly 6-8 μm. Herein, $D_{50}$, a volume based average particle diameter, is the diameter of particles corresponding to 50% of the total volume when accumulating volumes from smaller particles after measuring particle diameters by using a particle size analyzer.

When the primary particles and the secondary particles have an average particle diameter satisfying the above-defined ranges, the pellet density may be increased and processability of an electrode may be ensured. When the average particle diameter is excessively small, a large amount of conductive material is required, thereby making it difficult to form an electrode. When the average particle diameter is excessively large, output may be degraded.

The primary particles and/or the secondary particles may have a spherical or pseudo-spherical shape. Herein, the term 'pseudo-spherical' refers to a three-dimensional volume including an elliptical shape and covers any shapes of particles, such as amorphous particles whose shape cannot be defined.

In addition, according to an embodiment of the present disclosure, the negative electrode active material layer has a porous structure including a plurality of pores, and such a porous structure may be derived from at least one of the characteristics of the shapes of lithium titanium oxide particles as described hereinafter.

The lithium titanium oxide secondary particles have a porous structure having a plurality of pores formed on the surface and in the body of the secondary particles due to a plurality of pores formed among the aggregated primary particles. In addition, the lithium titanium oxide primary particles may have a porous structure including a plurality of pores formed on the surface and in the body of the primary particles. The pores are interconnected with at least one of the other adjacent pores and thus can function as a channel of an electrolyte. Therefore, the pores formed in the particles and interconnected with each other have a function as a channel through which an electrolyte flows.

According to an embodiment of the present disclosure, the lithium titanium oxide particles may have a specific surface area of 3-8 $m^2/g$, particularly 4-6 $m^2/g$.

When the lithium titanium oxide particles have a specific surface area satisfying the above-defined range, it is possible to ensure high rate characteristics, high output and high pellet density.

Particularly, when the lithium titanium oxide particles are primary particles, the primary particles may have a specific surface area of 5-8 $m^2/g$, particularly 6-7 $m^2/g$. In addition, when the lithium titanium oxide particles are secondary particles, the secondary particles may have a specific surface area of 3-6 $m^2/g$, particularly 4-5 $m^2/g$.

When the primary particles and the secondary particles have a specific surface area satisfying the above-defined ranges, it is possible to ensure pellet density and to improve processability of an electrode. The specific surface area is determined by using Brunauer Emmett Teller (BET) surface area analyzer.

The pellet density (pressing density) relates to whether the density of an electrode can be designed to a high level or not when forming the electrode by using a negative electrode active material. When the value of pellet density is increased under the same pressure during pressing, it is possible to design the density of an electrode to a higher level. For example, determination of the pressing density of the negative electrode active material may be carried out by using MCP-PD51, a powder resistance measuring system available from Mitsubishi Chemical. In the case of the powder resistance measuring system, a predetermined amount of negative electrode active material particles is introduced to a cylinder type load cell and force is applied thereto continuously. Then, the density measured while the particles are pushed is determined.

According to the present disclosure, the lithium titanium oxide particles may have a pellet density of 1.7 g/cc or more, particularly, 1.7-1.85 g/cc, and more particularly 1.75-1.82 g/cc, under a pressure of 64 MPa.

When the lithium titanium oxide particles have a pellet density satisfying the above-defined range, it is possible to obtain a high-density electrode and to increase the energy density.

Particularly, when the lithium titanium oxide particles are primary particles, the primary particles may have a pellet density of 1.7-1.78 g/cc, particularly 1.72-1.77 g/cc, under a pressure of 64 MPa. In addition, when the lithium titanium oxide particles are secondary particles, the secondary particles may have a pellet density of 1.75-1.83 g/cc, particularly 1.77-1.81 g/cc, under a pressure of 64 MPa.

When the lithium titanium oxide particles have a pellet density satisfying the above-defined ranges, it is possible to obtain a high-density electrode and to increase the energy density.

The pores formed between the lithium titanium oxide secondary particles and the other secondary particles of primary particles contained in the other adjacent secondary particles when the two types of particles are in contact with each other may affect the porous characteristics of a negative electrode active material layer.

Lithium titanium oxide has a spinel structure and shows a three-dimensional Li diffusion path, which is favorable to realization of high-speed charging and high output characteristics. In addition, lithium titanium oxide retains its original crystal structure during charging/discharging to provide excellent structural stability.

In addition, the lithium titanium oxide may have a capacity of 160-172 mAh/g, preferably 165-170 mAh/g upon lithiation.

In addition, the lithium titanium oxide may have a content of lithium carbonate, a byproduct of the manufacture thereof, of 0.5 wt % or less, or 0.2 wt % or less, based on 100 wt % of lithium titanium oxide.

The lithium titanium oxide may be obtained by a liquid phase synthesis process, such as co-precipitation, sol-gel or hydrothermal process, but is not limited thereto. There is no particular limitation in the method for preparing lithium titanium oxide, as long as the lithium titanium oxide particles having the characteristics disclosed herein can be obtained.

According to an embodiment of the present disclosure, the negative electrode active material may be loaded in an amount of 0.2-2 mAh/cm$^2$ in the negative electrode.

According to an embodiment of the present disclosure, the negative electrode active material layer may further include a binder resin and a conductive material. Herein, the negative electrode active material layer may include the negative electrode active material, conductive material and binder resin at a weight ratio of 80-95:3-13:2-9.

In addition to the lithium titanium oxide, the negative electrode active material layer may further include any one active material particles selected from the group consisting of currently used negative electrode active materials, including a carbonaceous material such as natural graphite or artificial graphite; metal (Me), such as Si, Sn, Li, Zn, Mg, Cd, Ce, Ni or Fe; alloy of the metal (Me); oxide (MeOx) of the metal (Me); and a composite of the metal (Me) with carbon, or a combination of two or more of them.

Non-limiting examples of the binder resin include any one selected from: polyvinylidene fluoride-hexafluoropropylene, polytetrafluoroethylene (PTFE), polyvinylidene fluoride (PVDF), carboxymethyl cellulose (CMC), polyvinyl alcohol (PVA), polyvinyl butyral (PVB), poly-N-vinylpyrrolidone (PVP), styrene butadiene rubber (SBR), polyamide-imide, polyimide, or the like, or a combination of two or more of them.

The conductive material is not particularly limited, as long as it is an electron conductive material causing no chemical change. Particular examples of the conductive material may include natural graphite, artificial graphite, carbon black, acetylene black, ketjen black, Super-P black, carbon fibers, metal powder or metal fibers, such as copper, nickel, aluminum or silver, or the like.

According to an embodiment of the present disclosure, the negative electrode may be obtained by the method as described hereinafter. First, a negative electrode active material, a binder resin and a conductive material are dispersed into an adequate solvent including an organic solvent, such as ethanol (EtOH), acetone, isopropyl alcohol, N-methylpyrrolidone (NMP) or propylene glycol (PG), or water to form a negative electrode slurry. Next, the negative electrode slurry is pressed to form a shape of electrode. Otherwise, the slurry is coated on metal foil to form a shape of electrode, or the composition for a negative electrode is rolled to form a sheet, which, in turn, is attached to metal foil to form a shape of electrode and the resultant electrode shape is dried at a temperature of 100-350° C. to obtain a negative electrode. More particularly, the negative slurry is pressed by using a roll press molding machine to form a negative electrode. The roll press molding machine is used to improve the electrode density and to control the electrode thickness through rolling, and includes a top roll, bottom roll, a controller capable of controlling the thickness of each roll and heating temperature, and an winding unit capable of winding and dewinding an electrode. When the roll-like electrode passes through the roll press, a pressing process is performed and the pressed electrode is wound again into a shape of roll to finish an electrode. Herein, the press has a pressing pressure of 5-20 ton/cm$^2$ and a roll temperature of 0-150° C. Then, the slurry subjected to the pressing process is subjected to a drying process. Herein, the drying process is carried out at a temperature of 100-350° C., preferably 150-300° C. When the drying temperature is lower than 100° C., it is difficult to carry out evaporation of the solvent. When the drying temperature is higher than 350° C., the conductive material may be oxidized undesirably during the drying at high temperature. Therefore, it is preferred that the drying temperature is 100° C. or higher and does not exceed 350° C. In addition, the drying process is preferably carried out at the temperature as mentioned above for about 10 minutes to 6 hours. Such a drying process can perform drying (solvent evaporation) of the molded composition for a negative electrode while allowing binding of powdery particles, thereby improving the strength of the negative electrode.

The lithium secondary battery according to the present disclosure includes the above-described negative electrode, a positive electrode, a separator interposed between the positive electrode and the negative electrode, and an electrolyte.

The positive electrode may be obtained by applying a mixture of a positive electrode active material, a conductive material and a binder to a positive electrode current collector, followed by drying. If desired, the mixture may further include a filler. The positive electrode active material is a compound capable of reversible lithium intercalation and deintercalation and particular examples thereof include a lithium metal composite oxide containing at least one metal, such as cobalt, manganese, nickel or aluminum, and lithium.

More particularly, particular examples of the lithium metal composite oxide may include at least one selected from: lithium-manganese oxides (e.g. $LiMnO_2$, $LiMn_2O_4$, or the like), lithium-cobalt oxides (e.g. $LiCoO_2$, or the like), lithium-nickel oxides (e.g. $LiNiO_2$, or the like), lithium-nickel-manganese oxides (e.g. $LiNi_{1-Y}Mn_YO_2$ (wherein 0<Y<1), $LiMn_{2-Z}Ni_ZO_4$ (wherein 0<Z<2), or the like), lithium-nickel-cobalt oxides (e.g. $LiNi_{1-Y1}Co_{Y1}O_2$(wherein 0<Y1<1), or the like), lithium-manganese-cobalt oxides (e.g. $LiCo_{1-Y2}Mn_{Y2}O_2$ (wherein 0<Y2<1), $LiMn_{2-Z1}Co_{Z1}O_4$ (wherein 0<Z1<2), or the like), lithium-nickel-manganese cobalt oxides (e.g. $Li(Ni_pCo_qMn_{r1})O_2$ (wherein 0<p<1, 0<q<1, 0<r1<1, p+q+r1=1), $Li(Ni_{p1}Co_{q1}Mn_{r2})O_4$ (wherein 0<p1<2, 0<q1<2, 0<r2<2, p1+q1+r2=2), or the like), and lithium-nickel-cobalt-transition metal (M) oxides (e.g. $Li(Ni_{p2}Co_{q2}Mn_{r3}M_{S2})O_2$ (wherein M is selected from the group consisting of Al, Fe, V, Cr, Ti, Ta, Mg and Mo, each of p2, q2, r3 and s2 independently represents the atomic ratio of an element, 0<p2<1, 0<q2<1, 0<r3<1, 0<s2<1, and p2+q2+r3+s2=1), or the like).

Particularly, in view of improvement in capacity characteristics and stability of an electrode, the lithium metal composite oxide may be $LiCoO_2$, $LiMnO_2$, $LiMn_2O_4$, $LiNiO_2$, lithium nickel manganese cobalt oxide (e.g. $Li(Ni_{1/3}Mn_{1/3}Co_{1/3})O_2$, $Li(Ni_{0.6}Mn_{0.2}Co_{0.2})O_2$, $Li(Ni_{0.4}Mn_{0.3}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like), or lithium nickel cobalt aluminum oxides (e.g. $Li(Ni_{0.8}Co_{0.15}Al_{0.05})O_2$, etc.), or the like. Specifically, in order to improve output characteristics after storage derived from an increase in voltage, the lithium metal composite oxide may include a lithium-manganese oxide, such as $LiMnO_2$ or $LiMn_2O_4$ (LMO).

The positive electrode active material may be used in an amount of 80-99 wt % based on the total weight of the solid content in the positive electrode slurry. Non-limiting examples of the positive electrode current collector include foil made of aluminum, nickel or a combination thereof. Reference can be made about the above description of the conductive material and binder related with the negative electrode.

In general, the separator may be a porous substrate having a plurality of pores alone, or the porous substrate including a porous coating layer containing a plurality of inorganic particles and a binder polymer and coated on at least one surface thereof.

The porous substrate may be a porous polymer substrate and particular examples thereof include a porous polymer film substrate or porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-130° C.

In addition, the porous polymer film substrate may be obtained by molding various polymers, such as polyesters, other than polyolefins, into a film shape. Further, the porous polymer film may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins. Although the porous substrate is not particularly limited in thickness, but preferably has a thickness of 1-100 μm, more preferably 5-50 μm. There is no particular limitation in the pore size and porosity in the porous substrate. However, the pore size and porosity are preferably 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer is preferably 50:50-99:1, and more preferably 70:30-95:5. When the weight ratio of the inorganic particles to the binder polymer satisfies the above-defined range, the amount of the binder polymer is increased to prevent a decrease in pore size and porosity in the coating layer to be formed. It is also possible to solve the problem of degradation of peeling resistance of the coating layer caused by a decrease in amount of the binder polymer.

In the porous coating layers, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

The inorganic particles are selected from the group consisting of inorganic particles having a dielectric constant of 5 or more, inorganic particles capable of transporting lithium ions or a mixture thereof.

According to an embodiment of the present disclosure, the electrolyte includes a salt having a structure of $A^+B^-$. Herein, $A^+$ includes an alkali metal cation, such as $Li^+$, $Na^+$, $K^+$ or a combination thereof. $B^-$ includes an anion, such as an anion of $F^-$, $Cl^-$, $Br^-$, $I^-$, $NO_3^-$, $BF_4^-$, $PF_6^-$, $N(CN)_2^-$, $SCN^-$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$ or $CH_3CO_2^-$, or a combination thereof. Preferably, the salt having a structure of $A^+B^-$ is a lithium salt.

The salt having a structure of $A^+B^-$ is dissolved or dissociated in an organic solvent. Non-limiting examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

In another aspect, there are provided a battery module including the secondary battery as a unit cell, and a battery pack including the battery module.

As descried above, the lithium secondary battery according to the present disclosure uses lithium titanium oxide as a negative electrode active material and uses an inexpensive lithium manganese composite oxide having high room temperature stability as a positive electrode active material, so that the output characteristics may be improved while not causing degradation of high-temperature characteristics and a decrease in battery capacity. Thus, it is possible to provide a battery pack which can be used efficiently as a substitute for a lead storage battery for vehicles or as an additive to the lead storage battery.

The battery pack may include a plurality of lithium secondary batteries connected in series, or a plurality of lithium secondary battery modules connected in series and having a plurality of lithium secondary batteries connected in parallel.

The battery pack may be used as an electric power source for a device requiring high temperature stability, improved cycle characteristics and high rate characteristics. Particular examples of the device may include but are not limited to: power tools driven by an electric motor; electric cars, including electric vehicles (EV), micro-hybrid electric vehicles (u-HEV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

LiOH as a lithium-containing precursor, $TiO_2$ as a titanium-containing precursor, NaOH as a sodium source and KOH as a potassium source were mixed in a solid phase according to the mixing ratio as shown in the following Table 1, and the mixture was dissolved in water under agitation to obtain a slurry. The slurry was spray dried at a hot air temperature of 200° C. and a discharge hot air temperature of 190° C., and then heat treated at 790° C. under oxygen atmosphere to obtain $Li_4Ti_5O_{12}$ powder.

Then, 92 wt % of the lithium titanium composite oxide obtained from Example 1, 4 wt % of carbon black as a conductive material and 4 wt % of polyvinylidene fluoride (PVdF) as a binder were added to N-methyl-2-pyrrolidone (NMP) as a solvent to form a negative electrode mixture slurry. The resultant negative electrode mixture slurry was applied to aluminum (Al) foil having a thickness of about 20 μm as a negative electrode current collector and then dried. After that, roll pressing was carried out to obtain a negative electrode including an active material layer having a porosity of about 33%.

<Manufacture of Positive Electrode>

First, 91 wt % of $Li(Ni_{0.4}Co_{0.3}Mn_{0.3})O_2$ as a positive electrode active material, 3.5 wt % of carbon black as a conductive material and 5.5 wt % of polyvinylidene fluoride (PVdF) as a binder were added to N-methyl-2-pyrrolidone (NMP) as a solvent to obtain a positive electrode mixture slurry. The resultant positive electrode mixture slurry was applied to aluminum (Al) foil having a thickness of about 20 μm as a positive electrode current collector and then dried. After that, roll pressing was carried out to obtain a positive electrode.

<Manufacture of Lithium Secondary Battery>

A porous polyethylene separator was interposed between the positive electrode and the negative electrode to form an electrode assembly. Then, the electrode assembly was introduced to a pouch type battery casing and an electrolyte containing 1 M $LiPF_6$ dissolved in a solvent including ethylene carbonate (EC) and diethyl carbonate (DEC) mixed at a volume ratio of 30:70 was injected thereto. After that, the battery casing was sealed to obtain a lithium secondary battery.

<Manufacture of Half-Cell>

A half-cell was manufactured as follows.

To 0.98 g of the lithium titanium oxide ($Li_4Ti_5O_{12}$) prepared as described above, 0.4 g of a binder solution including 5 wt % of polyvinylidene fluoride (PVdF) dissolved in N-methyl pyrrolidone (NMP) was added. Then, the resultant mixture was mechanically agitated to obtain a slurry (weight ratio of $Li_4Ti_5O_{12}$:PVdF=98:2).

The slurry was applied onto aluminum foil to a thickness of 90 μm and vacuum dried at 120° C. to obtain a negative electrode.

Then, the negative electrode was wound into a circular shape having a diameter of 12 mm and lithium metal foil was used as a counter electrode to obtain a 2032 type coin half-cell. The electrolyte used herein was 1.3M $LiPF_6$ solution dissolved in a solvent including ethylene carbonate, diethylene carbonate and dimethyl ethyl carbonate mixed at a volume ratio of 3:5:2.

Examples 2-5

Each of $Li_4Ti_5O_{12}$ powder, a negative electrode, a lithium secondary battery and a half-cell was obtained in the same manner as descried in Example 1, except that LiOH as a lithium-containing precursor, $TiO_2$ as a titanium-containing precursor, NaOH as a sodium source and KOH as a potassium source were mixed in a solid phase according to the mixing ratio as shown in the following Table 1.

Comparative Example 1

Each of $Li_4Ti_5O_{12}$ powder, a negative electrode, a lithium secondary battery and a half-cell was obtained in the same manner as descried in Example 1, except that LiOH was used as a lithium-containing precursor and $TiO_2$ as a titanium-containing precursor were purified and then the precursors were mixed in a solid phase according to the mixing ratio as shown in the following Table 1. Herein, the purification was carried out in such a manner that the finished $Li_4Ti_5O_{12}$ powder may have a Na content and a K content controlled to 10 ppm and 200 ppm, respectively, as shown in the following Table 2.

Comparative Example 2

Each of $Li_4Ti_5O_{12}$ powder, a negative electrode, a lithium secondary battery and a half-cell was obtained in the same manner as descried in Example 1, except that LiOH as a lithium-containing precursor, $TiO_2$ as a titanium-containing precursor, NaOH as a sodium source and KOH as a potassium source were mixed in a solid phase according to the mixing ratio as shown in the following Table 1.

Comparative Example 3

Each of $Li_4Ti_5O_{12}$ powder, a negative electrode, a lithium secondary battery and a half-cell was obtained in the same manner as descried in Example 1, except that LiOH as a lithium-containing precursor was purified and then mixed with $TiO_2$ as a titanium-containing precursor, NaOH as a sodium source and KOH as a potassium source in a solid phase according to the mixing ratio as shown in the following Table 1. Herein, the purification was carried out in such a manner that the finished $Li_4Ti_5O_{12}$ powder may have a K content controlled to 450 ppm as shown in the following Table 2.

Comparative Examples 4-8

Each of $Li_4Ti_5O_{12}$ powder, a negative electrode, a lithium secondary battery and a half-cell was obtained in the same manner as descried in Example 1, except that LiOH as a lithium-containing precursor, $TiO_2$ as a titanium-containing precursor, NaOH as a sodium source and KOH as a potassium source were mixed in a solid phase according to the mixing ratio as shown in the following Table 1.

TABLE 1

|  | $TiO_2$ (g) | LiOH (g) | NaOH (mg) | KOH (mg) |
| --- | --- | --- | --- | --- |
| Example 1 | 97.1 | 40.81 | 2.2 | 0 |
| Example 2 | 97.1 | 40.81 | 12.2 | 130 |
| Example 3 | 97.1 | 40.81 | 17.2 | 190 |
| Example 4 | 97.1 | 40.81 | 27.2 | 190 |
| Example 5 | 97.1 | 40.81 | 22.2 | 150 |
| Comp. Ex. 1 | 97.1 | 40.81 | 0 | 0 |
| Comp. Ex. 2 | 97.1 | 40.81 | 27.2 | 220 |
| Comp. Ex. 3 | 97.1 | 40.81 | 2.2 | 0 |
| Comp. Ex. 4 | 97.1 | 40.81 | 1.2 | 0 |
| Comp. Ex. 5 | 97.1 | 40.81 | 30.2 | 130 |
| Comp. Ex. 6 | 97.1 | 40.81 | 1.2 | 130 |
| Comp. Ex. 7 | 97.1 | 40.81 | 12.2 | 130 |
| Comp. Ex. 8 | 97.1 | 40.81 | 12.2 | 130 |

Characterization (1) Na Content and K Content

For each lithium titanium oxide ($Li_4Ti_5O_{12}$) obtained according to Examples 1-5 and Comparative Examples 1-8, Na content and K content were determined by inductively coupled plasma (ICP) analysis (ICP-AES, ICPS-8100, SHIMADZU/RF source 27.12 MHz/sample uptake rate 0.8 mL/min). The results are shown in the following Table 2.

(2) Crystallite Size

The crystallite size of each lithium titanium oxide ($Li_4Ti_5O_{12}$) obtained according to Examples 1-5 and Comparative Examples 1-8 was determined by using TOPAS, a program currently used for Rietveld refinement based on X-ray diffractometry.

(3) Pellet Density (Pressing Density)

The pellet density was determined by using MCP-PD51, a powder resistance measuring system available from Mitsubishi Chemical. Herein, a predetermined amount of each lithium titanium oxide ($Li_4Ti_5O_{12}$) obtained according to Examples 1-5 and Comparative Examples 1-8 was introduced to a cylinder type load cell and a pressure of 64 MPa was applied thereto continuously. Then, the density measured while the particles were pushed was determined. The results are shown in the following Table 2.

(4) Initial Capacity

The initial capacity of each of the half-cells according to Examples 1-5 and Comparative Examples 1-8 was determined on the basis of the second discharge (Li intercalation) capacity at 0.2 C. Herein, the cut off voltage was 1.0-2.5V. The results are shown in the following Table 2.

TABLE 2

|  | Lithium titanium oxide | Na content (ppm) | K content (ppm) | Crystallite size (nm) | Pellet density (g/cc) | Initial capacity (mAh/g) (based on Li intercalation) |
| --- | --- | --- | --- | --- | --- | --- |
| Example 1 | $Li_4Ti_5O_{12}$ | 50 | 500 | 180 | 1.79 | 168 |
| Example 2 | $Li_4Ti_5O_{12}$ | 150 | 1800 | 150 | 1.80 | 170 |
| Example 3 | $Li_4Ti_5O_{12}$ | 200 | 2400 | 120 | 1.78 | 168 |
| Example 4 | $Li_4Ti_5O_{12}$ | 300 | 2400 | 120 | 1.76 | 168 |
| Example 5 | $Li_4Ti_5O_{12}$ | 250 | 2000 | 150 | 1.77 | 167 |
| Comp. Ex. 1 | $Li_4Ti_5O_{12}$ | 10 | 200 | 250 | 1.80 | 162 |
| Comp. Ex. 2 | $Li_4Ti_5O_{12}$ | 300 | 2700 | 75 | 1.72 | 160 |
| Comp. Ex. 3 | $Li_4Ti_5O_{12}$ | 50 | 450 | 190 | 1.78 | 160 |

TABLE 2-continued

| | Lithium titanium oxide | Na content (ppm) | K content (ppm) | Crystallite size (nm) | Pellet density (g/cc) | Initial capacity (mAh/g) (based on Li intercalation) |
|---|---|---|---|---|---|---|
| Comp. Ex. 4 | $Li_4Ti_5O_{12}$ | 40 | 500 | 210 | 1.78 | 158 |
| Comp. Ex. 5 | $Li_4Ti_5O_{12}$ | 330 | 1800 | 130 | 1.75 | 167 |
| Comp. Ex. 6 | $Li_4Ti_5O_{12}$ | 40 | 1800 | 160 | 1.76 | 166 |
| Comp. Ex. 7 | $Li_4Ti_5O_{12}$ | 150 | 1800 | 90 | 1.72 | 163 |
| Comp. Ex. 8 | $Li_4Ti_5O_{12}$ | 150 | 1800 | 220 | 1.75 | 161 |

(5) Evaluation of Voltage Drop

Each of the half coin cells according to Examples 1-3 and Comparative Examples 1, 5 and 6 was subjected to charging/discharging twice, and then the voltage drop was determined under the condition of SOC 50 as a function of 10 C pulse time. The results measured up to 10 seconds are shown in FIG. 1.

Referring to FIG. 1, as compared to Comparative Examples 1, 5 and 6, Examples 1-3 show a lower voltage drop. It is thought that the lithium titanium oxide particles in each of the negative electrodes used in the half coin cells according to Examples 1-3 satisfy all of the conditions including a Na content of 50 ppm-300 ppm, K content of 500 ppm-2400 ppm and a crystallite size of 100 nm-200 nm, and thus reduces the overall resistance. On the contrary, it is thought that the lithium titanium oxide particles in each of the negative electrodes used in the half coin cells according to Comparative Examples 1, 5 and 6 cannot satisfy at least one of the above-mentioned conditions, and thus show a relatively large increase in electrode resistance.

What is claimed is:

1. A negative electrode active material comprising:
lithium titanium oxide particles, wherein the lithium titanium oxide particles have a Na content of 50 ppm-300 ppm, a K content of 500 ppm-2400 ppm and a crystallite size of 100-200 nm, and the lithium titanium oxide is represented by the following Chemical Formula 1:

$$Li_xTi_yO_zM_w$$ [Chemical Formula 1]

wherein M is any one selected from the group consisting of Zr, B, Sn, S, Be, Ge and Zn, or a combination of two or more of them, 0.5≤x≤5, 1≤y≤5, 2≤z≤12, and 0≤w<0.1.

2. The negative electrode active material according to claim 1, wherein the lithium titanium oxide particles are at least one selected from primary particles and secondary particles formed of the primary particles.

3. The negative electrode active material according to claim 2, wherein the primary particles have an average particle diameter ($D_{50}$) of 0.8-1.2 μm and a specific surface area of 5-8 m²/g.

4. The negative electrode active material according to claim 2, wherein the lithium titanium oxide particles are secondary particles, which have an average particle diameter ($D_{50}$) of 2-9 μm and a specific surface area of 3-6 m²/g.

5. The negative electrode active material according to claim 1, wherein the lithium titanium oxide is at least one selected from the group consisting of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $LiTi_2O_4$ and $Li_2TiO_3$.

6. The negative electrode active material according to claim 1, which further comprises any one active material particles selected from the group consisting of: a carbonaceous material; a metal (Me); alloy including the metal (Me); oxide of the metal (Me); and a composite of the metal (Me) with carbon, or a combination of two or more of them.

7. A lithium secondary battery compring:
a positive electrode comprising a positive electrode active material,
a negative electrode comprising a negative electrode active material,
a separator interposed between the positive electrode and the negative electrode, and
an electrolyte,
wherein the negative electrode active material is the negative electrode active material as defined in claim 1.

8. The negative electrode active material according to claim 6, wherein the metal (Me) is selected from Si, Sn, Li, Zn, Mg, Cd, Ce, Ni or Fe.

* * * * *